US010230696B2

United States Patent
Smith et al.

(10) Patent No.: US 10,230,696 B2
(45) Date of Patent: Mar. 12, 2019

(54) SYSTEM, APPARATUS AND METHOD FOR MANAGING LIFECYCLE OF SECURE PUBLISH-SUBSCRIBE SYSTEM

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 14/864,957

(22) Filed: Sep. 25, 2015

(65) Prior Publication Data

US 2016/0366111 A1    Dec. 15, 2016

Related U.S. Application Data

(60) Provisional application No. 62/172,893, filed on Jun. 9, 2015.

(51) Int. Cl.
*H04L 29/06* (2006.01)
*H04L 29/08* (2006.01)
(Continued)

(52) U.S. Cl.
CPC ........ *H04L 63/0435* (2013.01); *H04L 63/065* (2013.01); *H04L 63/0807* (2013.01);
(Continued)

(58) Field of Classification Search
CPC . H04L 63/0435; H04L 67/2809; H04L 29/06; H04L 29/08
See application file for complete search history.

(56) References Cited

U.S. PATENT DOCUMENTS 6,684,331 B1    1/2004  Srivastava
8,365,254 B2 *  1/2013  Burke .................. G06F 21/604
                                                  726/21
(Continued)

FOREIGN PATENT DOCUMENTS

EP        2544425 A2      1/2013
WO       2010090027       8/2010

OTHER PUBLICATIONS

International Searching Authority, "Notification of Transmittal of the International Search Report and the Written Opinion of the International Searching Authority," dated Aug. 8, 2016 in International application No. PCT/US2016/033824.

(Continued)

*Primary Examiner* — Joseph P Hirl
*Assistant Examiner* — Hassan Saadoun
(74) *Attorney, Agent, or Firm* — Trop, Pruner & Hu, P.C.

(57) ABSTRACT

In one embodiment, a method includes: request enrollment of the device with an identity provider, the enrollment including at least one role for the device for a publish-subscribe protocol of a distributed network; receiving a device identity credential from the identity provider and store the device identity credential in the device; receiving a ticket credential for a first topic associated with a first publisher, the ticket credential including the at least one role for the device; receiving a group key from a key manager for a group associated with the publish-subscribe protocol; and receiving content for the first topic in the device, the content protected by the group key.

24 Claims, 6 Drawing Sheets

(51) Int. Cl.
H04W 12/04 (2009.01)
H04W 84/18 (2009.01)
H04W 4/80 (2018.01)
(52) U.S. Cl.
CPC ........ *H04L 67/125* (2013.01); *H04L 67/2809* (2013.01); *H04L 69/03* (2013.01); *H04W 4/80* (2018.02); *H04W 12/04* (2013.01); *H04W 84/18* (2013.01)

(56) References Cited

U.S. PATENT DOCUMENTS

| | | | | |
|---|---|---|---|---|
| 8,650,392 | B2* | 2/2014 | Lowekamp | H04L 63/0807 713/155 |
| 2004/0122906 | A1* | 6/2004 | Goodman | G06Q 10/107 709/206 |
| 2006/0123117 | A1* | 6/2006 | Heutchy | G06F 21/10 709/227 |
| 2007/0061815 | A1 | 3/2007 | Graham et al. | |
| 2007/0274525 | A1* | 11/2007 | Takata | H04L 63/065 380/270 |
| 2012/0036219 | A1 | 2/2012 | Eslambolchi et al. | |
| 2012/0059882 | A1 | 3/2012 | Stark et al. | |
| 2012/0215872 | A1* | 8/2012 | Beardsmore | H04L 51/14 709/207 |
| 2012/0221650 | A1 | 8/2012 | Bhogal et al. | |
| 2016/0315913 | A1* | 10/2016 | Lu | H04L 65/1069 |
| 2016/0364553 | A1* | 12/2016 | Smith | G06F 21/105 |

OTHER PUBLICATIONS

Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish-Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.
openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.
openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.
U.S. Appl. No. 14/968,125, filed Dec. 14, 2015, entitled "A Self-Configuring Key Management System for an Internet of Things Network" by Ned M. Smith.
U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices" by Ned M. Smith, et al.
Wikipedia, "Tor", https://en.wikipedia.org/wiki/Tor_%28anonymity_network%29, Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.
European Patent Office, Extended European Search Report dated Dec. 19, 2018 in European Patent Application No. 16808009.1, eight pages.

* cited by examiner

SYSTEM, APPARATUS AND METHOD FOR MANAGING LIFECYCLE OF SECURE PUBLISH-SUBSCRIBE SYSTEM

CROSS-REFERENCE TO RELATED APPLICATION

This application claims priority to U.S. Provisional Patent Application No. 62/172,893 filed on Jun. 9, 2015 and entitled "SYSTEM, APPARATUS AND METHOD FOR MANAGING LIFECYCLE OF SECURE PUBLISH-SUBSCRIBE SYSTEM", the content of which is hereby incorporated by reference.

BACKGROUND

Legacy embedded systems, networks, and fieldbus architectures for factory automation, heating ventilation and air conditioning (HVAC) control, building automation, transportation, and other applications have relied on publish-subscribe (pub-sub) messaging methods to achieve highly scalable networks (having many nodes) while also guaranteeing timely message delivery for automation and control applications. Historically, control networks have been supplied by proprietary, vertically integrated vendors and have been isolated from corporate backbone networks and the Internet. Such isolation has benefited security by providing physical separation between control networks (which place a high value on safe operation) and backbone/Internet networks that are largely exposed to malware and a variety of miscreant attacks. However, as Internet of things (IoT) technology becomes more prevalent, pub-sub messaging infrastructure of legacy networks will be more complex and insecure.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 3-1 and 3-2 is a sequence diagram showing key management flows with pub-sub flows to establish keys prior to exchange of application data or control messages.

DETAILED DESCRIPTION

Figure 1:
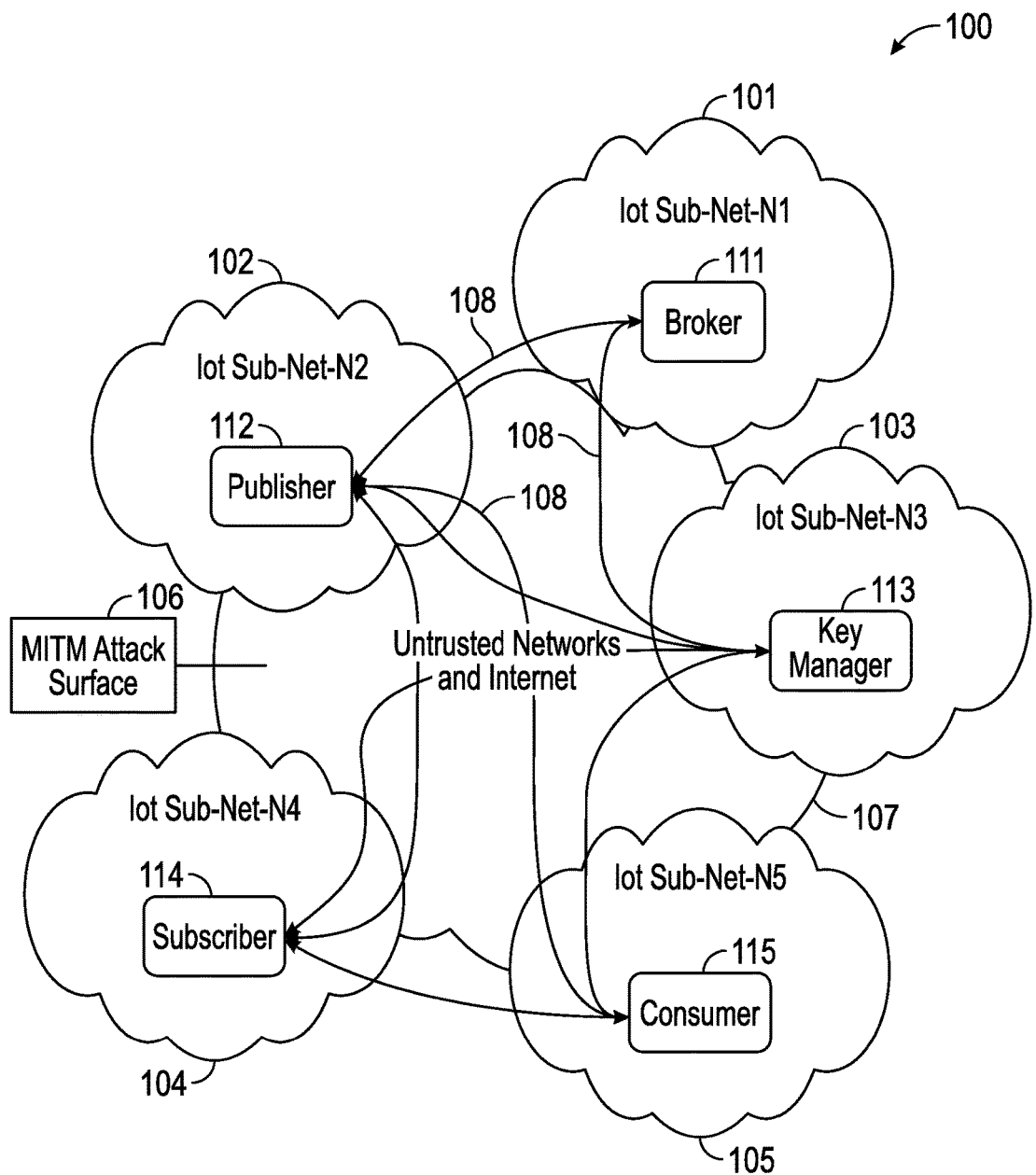
FIG. 1 is a block diagram of a system model showing pub-sub performers in accordance with an embodiment.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

In various embodiments, key management techniques are provided to enable each exchange in a pub-sub model to be prefaced by a key exchange. Furthermore, pub-sub models often utilize a group (shared symmetric) key that a publisher, subscriber and/or notification consumer first obtains before shared content, which is protected using the group key, can be consumed. In embodiments, pub-sub performers, including a key management performer, may be isolated from each other by untrusted networks but still be able to obtain keys to apply message integrity and confidentiality protections for pub-sub messages. In embodiments, Needham-Schroeder-inspired distributed key management techniques may be used to avoid dependence on a dedicated trusted network for controlling key management specific traffic.

In embodiments, performers include publishers, subscribers, notification consumers, brokers, and key managers. In some embodiments, multiple brokers and key managers may be employed to address scalability and load balancing requirements. The key manager may be configured to issue keys to each of the pair-wise interactions that may occur between performers. Pairwise keys are used to protect message traffic between paired performers. Some interactions involve multiple performers and may implement use of a group shared key. The key manager facilitates provisioning of the group key by issuing a group credential that may be delivered to multiple performers and may have a defined lifetime and scope in which to continue allowing additional performers access to the key during which shared contents can be exchanged under the key. Key metadata helps provide context for when and how a key is used. Key metadata accompanies the key so that all parties maintain a consistent understanding of the context, even though the performer actions are distributed.

Pub-sub group members may be added by obtaining a mini-ticket from a key manager. They may be removed by allowing the mini-ticket to expire. Expansion of a group may be prevented by signaling a key manager to remove a group key such that a mini-ticket containing the group key cannot be issued subsequently. This approach benefits from performance advantages of symmetric cryptography for minimal message processing latencies. It also minimizes key management processing semantics by shadowing pub-sub operations with key management pre-requisites.

Embodiments provide a symmetric key manager that issues "tickets" or "mini-tickets" including pub-sub authorizations that restrict which pub-sub role the device can enter in order to perform the requested operation. Furthermore, a pub-sub role assignment given to a mini-ticket can be applied using a trusted execution environment (TEE), where the trusted environment ensures the pub-sub role is performed by an appropriate processor specialized for the intended pub-sub role respectively.

Various pub-sub message exchanges can be performed in a given sequence and timing but prefaced by key management exchanges. Hence, pub-sub systems such as XMPP, DDS, MQTT and others including RESTful approaches may be able to integrate key management messages using native message exchange infrastructure and formatting.

JSON Web Token (JWT) is another example message exchange infrastructure that can, when coupled with embodiments addressed herein, protect key management exchanges over pub-sub systems (such as XMPP, DDS, MQTT, RESTful) such that they become integral to a scalable web-based (or enterprise based) key management infrastructure. This is important because the infrastructure conventionally used by IoT devices may double for key management infrastructure. This reduces overall cost of an IoT node where the alternative often is to deploy a key management specific infrastructure such as PKI or Kerberos via GSSAPI.

Referring now to FIG. 1, shown is a block diagram of a system 100 showing pub-sub performers in accordance with an embodiment. Performers include a broker 111 in IoT sub-network N1 101, a publisher 112 in IoT subnetwork N2 102, a key manager 113 in IoT subnetwork N3, a subscriber 114 in IoT subnetwork N4, and a consumer 115 in IoT subnetwork N5 105. As shown, each performer is isolated from each other and vulnerable to man in the middle (MITM) attackers via the MITM attack surface 106 from untrusted inter-networks including the Internet 107. While the performers are isolated from each other, that do couple with one another via communication channels 108 (not all of which are labeled in FIG. 1). However, as described in greater detail with regards to FIGS. 1 and 2, security threats may be addressed by implementing a key management protocol over an existing pub-sub messaging layer that bootstraps keys as part of performance of the pub-sub message exchanges.

Figure 2:
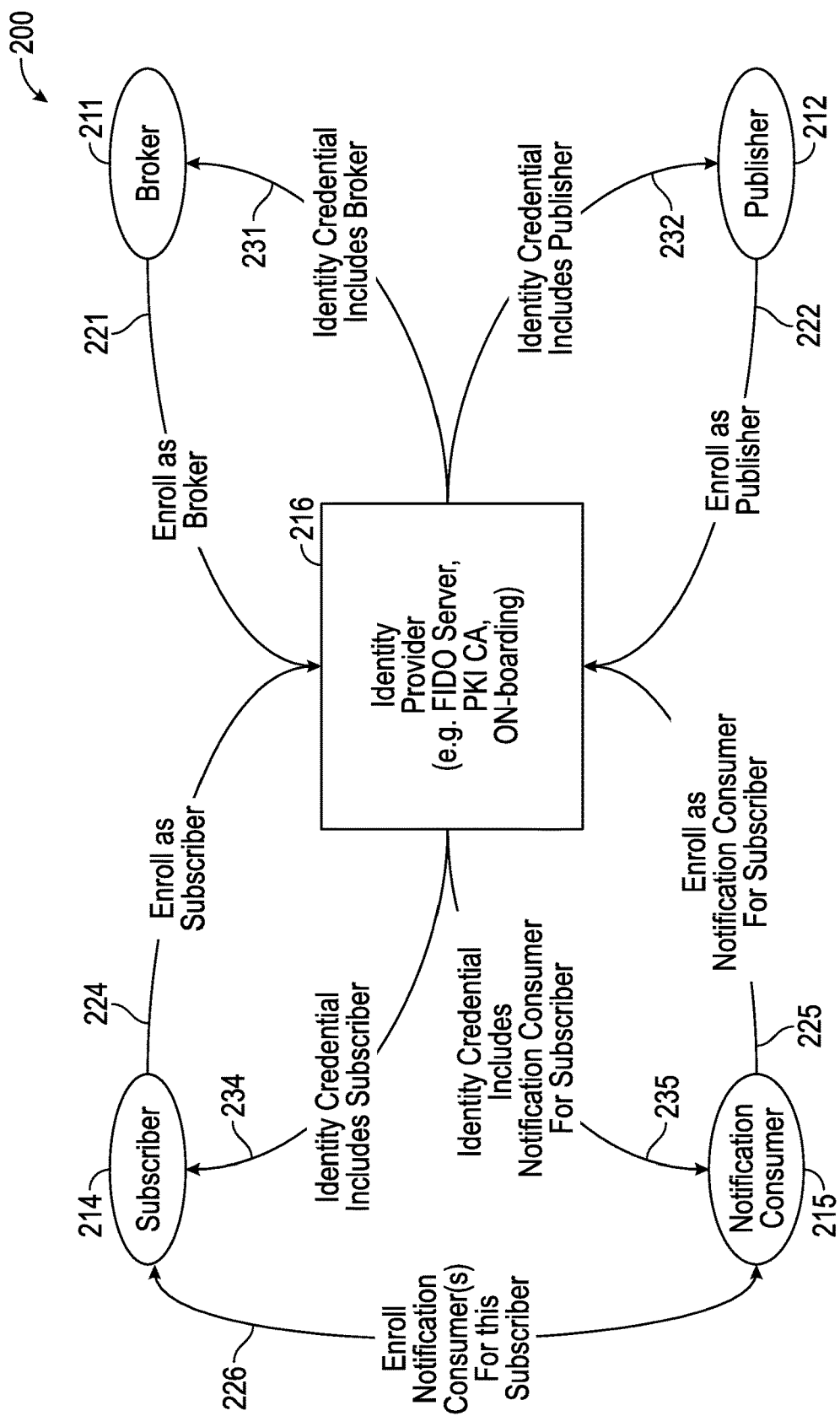
FIG. 2 is a flow diagram of pub-sub role assignment applied during IoT device credentialing in accordance with an embodiment.

Referring now to FIG. 2, shown is a flow diagram of pub-sub role assignment applied during IoT device credentialing in accordance with an embodiment. In an embodiment, a method 200 is provided for assigning pub-sub role assignments to performers broker 211, publisher 212, subscriber 214, and consumer 215. The credentials received allow the various IoT devices/performs to perform their functions. FIG. 2 demonstrates an enrollment protocol where the device enrolls (enrollment requests 221, 222, 224, 225, 226) with an identity provider. An identity provider 216 may include, for example, a FIDO PKI Certificate Authority. However, an identity provider 216 may instead be handled with a device on-boarding process as defined by the Open Interconnect Consortium. In fact, an IoT device may enroll with multiple pub-sub roles (e.g., a device or node may be both a publisher and a subscriber for differing topics of a pub-sub protocol or even for the same topic of a pub-sub protocol). Hence, the device identity credential received (credential deliveries 231, 232, 234, 235) may include or provide for both publisher and subscriber roles.

In a specific use of a symmetric key, the specific role that is being exercised may be asserted and included in the ticket issued by the Key Manager. A special case of enrollment allows a Subscriber to specify a set of Notification Consumers that are authorized to receive notifications on behalf of the Subscriber, so that Publisher messages that generate notifications can be delivered only to authorized notification consumers, and further constrained to notification consumers who are delegates of a subscriber.

Embodiments may enable pub-sub stereotyping semantics to become explicit authorizations that may be verified by a performer prior to performing the action. This enables safe operation requirements of the system to be preserved across a distributed topology that crosses untrusted networks.

Figures 1, 3:
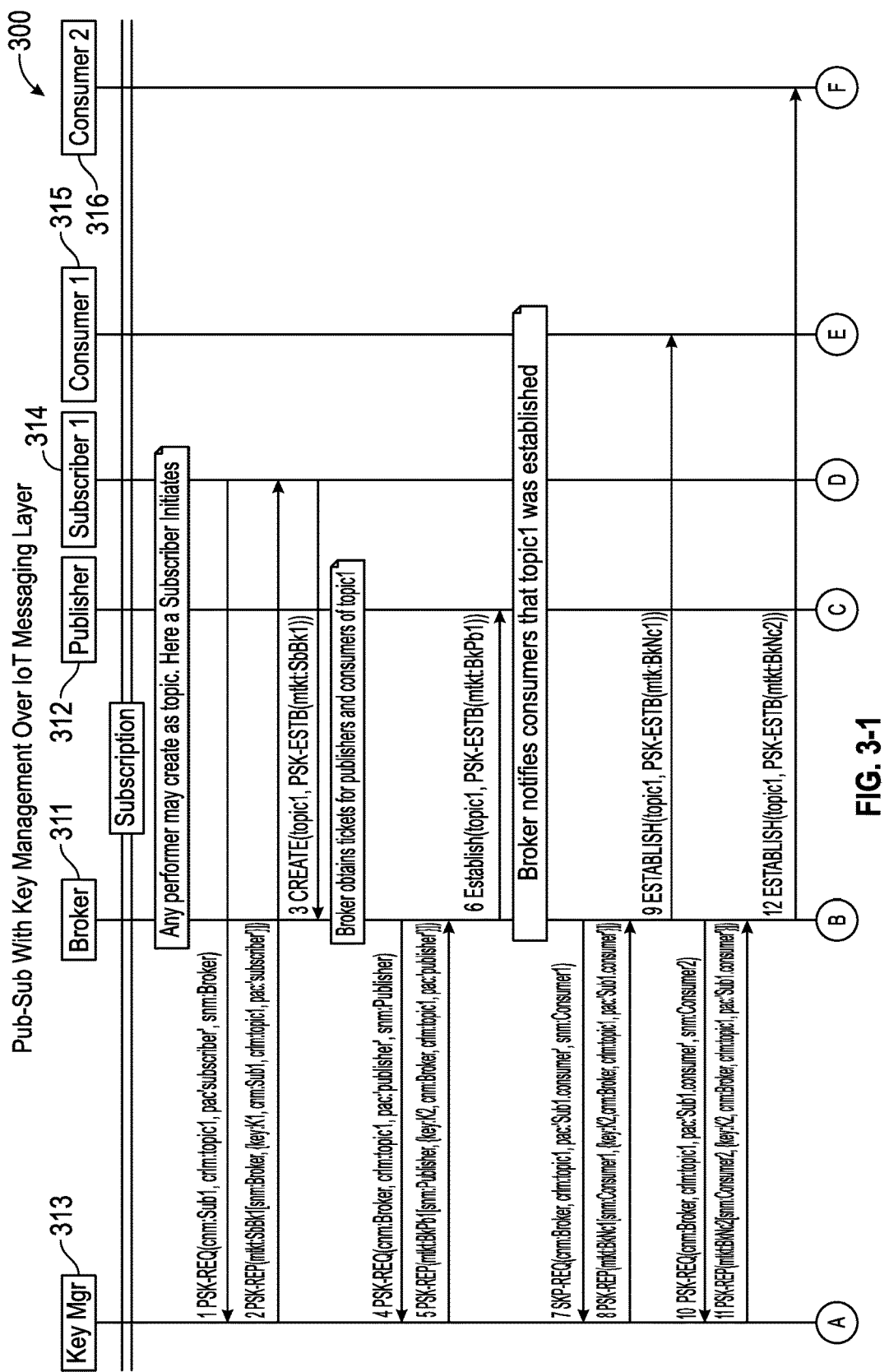
Figures 2, 3:
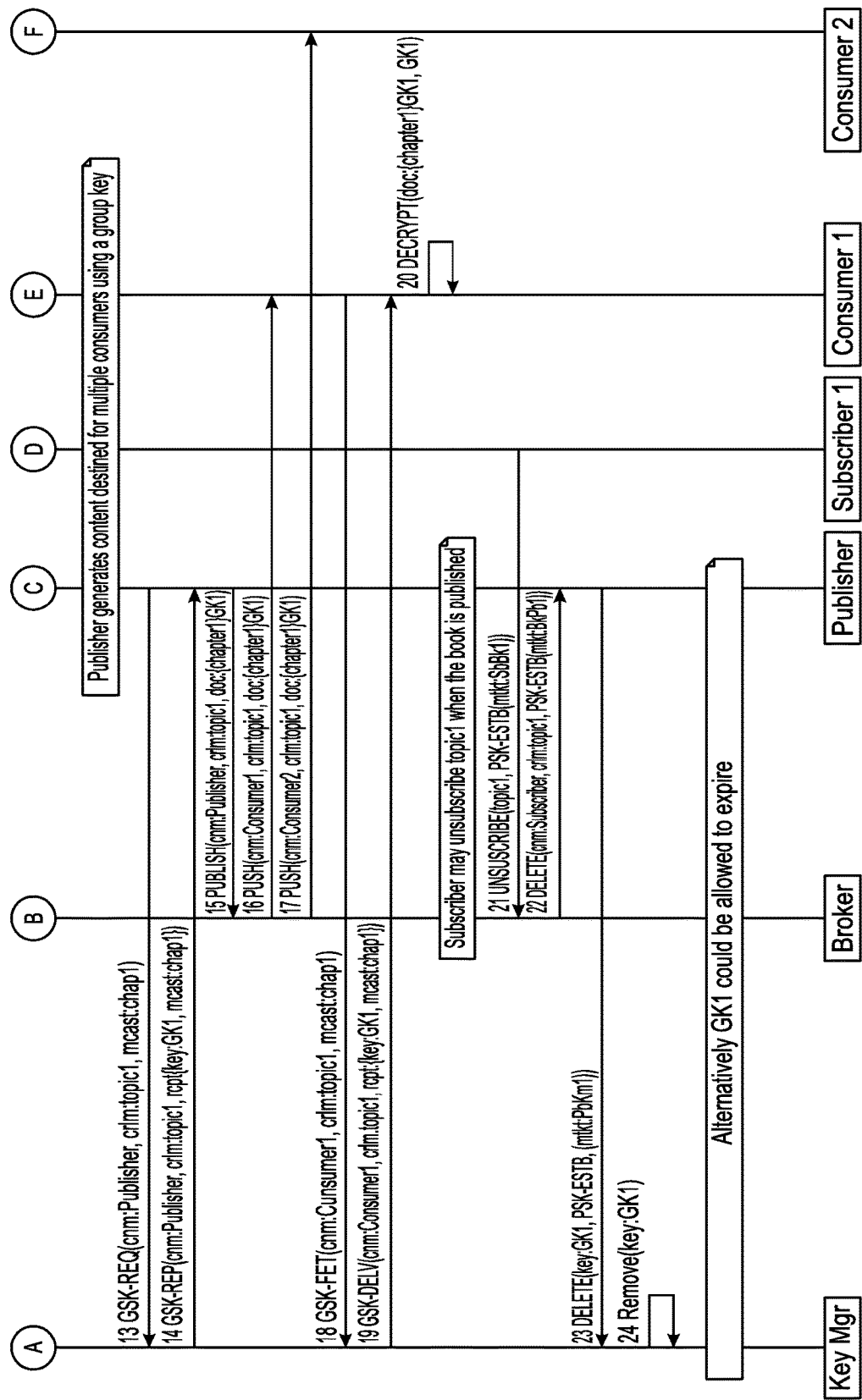

Referring now to FIGS. 3-1 and 3-2, shown is a sequence diagram showing a key management method 300 to establish keys prior to exchange of application data or control messages. Method 300 details a pub-sub scenario involving a key manager 313, broker 311, publisher 312, subscriber 314, and notification consumers 315, 316. It is assumed that before element 1 of process 300 occurs, the publisher has already created a topic ("topic1") providing context for message exchange.

Since a security model in an embodiment dictates that all exchanges occur over a secure channel (e.g., DTLS), at element 1 the subscriber obtains a shared key for the publisher-broker communication. This key is contained in the ticket credential named "SbBk1" at element 2.

More specifically, at element 1 subscriber 314 sends a request "PSK-REQ" to the key manager 313 for a ticket. As used herein, an example of a "request" and a "reply" include "GSK-REQ"/"PSK-REQ" and "GSK-REP"/"PSK-REP", however "GSK-FET"/"PSK-FET" may also be considered a request and "GSK-DEL"/"PSK-DEL" may also be considered a reply. Further details regarding such requests and replies are located at, for example, https://tools.ietf.org/id/draft-hardjono-ace-fluffy-00***txt.

The request of element 1 includes a filter element "cr1m: topic1" which provides that the realm or topic is "topic 1". In a pub-sub protocol, subscribers may receive only a subset of the total messages published. The process of selecting messages for reception and processing may be referred to as filtering. Embodiments allow for various forms of filtering such as topic-based and content-based filtering. In a topic-based system, messages are published to "topics" or named logical channels, such as "topic1" in element 1. Subscribers in a topic-based system will receive all messages published to the topics to which they subscribe, and all subscribers to a topic will receive the same messages. The publisher is responsible for defining the classes of messages to which subscribers can subscribe. In a content-based system, messages are only delivered to a subscriber if the attributes or content of those messages match "constraints" defined by the subscriber. The subscriber is responsible for classifying the messages. Some embodiments support a hybrid of the two whereby publishers post messages to a topic while subscribers register content-based subscriptions to one or more topics. Regarding element 1, the filter element may be for, as an example, topic-based and/or content-based filtering. The filter element helps define the "context" for the pub-sub messaging.

The request of element 1 includes an identity credential, such as the credential from element 234 of FIG. 2. In element 1 the credential is the privilege attribute certificate (pac) pac: 'subscriber'. The credential corresponds to a role (i.e., subscriber) for the device with a publish-subscribe protocol. In an embodiment, the credential may include a certificate from a certificate authority that attests to the role for the first device. This certificate may be used to authenticate messages related to the subscriber. The identity credential may be tied to authorization permissions that may be applied to the data protected by the key or permissions related to the use of the key. Such permissions or "privileges" may include READ, WRITE, COPY, MODIFY, DELETE, DISTRIBUTE and DELEGATE privileges as well as whether a node is entitled to publish on a pub-sub topic.

The request may include other key metadata such as client name (cnm) cnm:Sub1 for subscriber 1 (the identity of the client requesting creation of the key) and server name (snm) snm:Broker indicating the subscriber is requesting a key with which to communicate with the broker.

The request itself may be encrypted based on pair-wise keys exchanged between the subscriber and the key manager using, for example, a Diffie-Hellman exchange. The semantics of pairwise credentials asserts that if a device A knows a paired device B shares a pairwise key, only devices A and B share that key. Use of a pairwise key can be used by device A to authenticate device B by asserting that if the authentication challenge was not created by device A, then only device B could have supplied the challenge. Pairwise keys can be used to establish secure communication between devices A and B that protect data integrity and confidentiality.

The reply of element 2 ("PSK-REQ") includes the security ticket, which is restricted to the filter element (cr1m: topic1) and includes a key (K1). The reply may include other elements not explicitly shown in FIGS. 3-1 and 3-2, such as an expiration date for when the key expires.

The broker may establish publishers and notification consumers who produce/consume content respectively. Thus, element 3 includes a "create" command for such content and the command may be wrapped (i.e., encrypted) with the K1 key.

Then the broker obtains a ticket to interact with publishers and subscriber obtains a ticket to interact with the broker. Tickets contain the pub-sub role restriction identified in the "pac" structure. The ticket therefore asserts which pub-sub role the device must assume when processing a request. Notably the key manager relies upon the device credential issued to each device to determine which pub-sub roles the device is allowed to assert. In this way, the ticket doubles as a method for dynamic role switching in a distributed system. In greater detail, in element 4 the broker makes a request for a pair-wise key with which to communicate with the publisher. The request includes an identify credential, filter element, and key metadata similar to element 1. The reply includes another pair-wise key (K2), which is used to wrap a topic "establish" command in element 6.

Elements 7-9 are analogous to elements 4-6 but concern efforts to obtain a third pair wise key with which to communicate with a consumer (consumer1). Elements 10-12 are analogous to elements 4-6 but concern efforts to obtain a fourth pair wise key with which to communicate with a consumer (consumer2).

Content exchange may occur among publishers and consumers where the broker is not privy to exchanged content. Therefore, a group key "GK1" is created where GK1 is not shared with the broker. The broker is not required to be a trusted third party for all content exchanged over the pub-sub infrastructure. More specifically, in element 13 the publisher sends a request to the key manager. The request content to be published is "chap1" under the topic "topic1". In element 14 the reply includes the GK1, but group keys are not required and other embodiments may use other forms of keys.

Element 15 shows the effort to publish chapter 1 to the broker and elements 16-17 show the broker pushing the content (wrapped by the group key) to the subscribers. Elements 18, 19 show the consumer requesting the group key and receiving the group key with which to decrypt chapter 1 in element 20. The fetch message "GSK-FET" includes various fields analogous to those of the request "GSK-REQ", including items such as protocol version, client identity, client realm, multicast group identity, aspects concerning key expiration, anti-reply considerations (e.g., nonce), and the like. The same is true for "GSK-DEL" delivering a key in a manner similar to "GSK-REP". Elements similar to elements 18-20 may be performed for consumer2 316 but are not shown for brevity. Messages such as requests, replies, fetch and deliver commands (e.g., elements 1, 2, 18, 19) may be protected between two nodes using symmetric pair-wise keys distributed between the sending/receiving elements via Diffie-Hellman exchanges and the like. Diffie-Hellman exchange may apply several techniques for establishing trust in the opposite entity including signing key exchange messages using a manufacturer's key/certificate such as Intel EPID, TCG TPM Attestation Identity Key (AIK), or other embedded credentials. It may further be established using previously negotiated context such as a PIN or other attribute data and further augmented with the exchange of an attestation hash of the device's local TEE configuration and memory state that may be cross-checked with a whitelist.

Participants in a group can be limited by removing the group key from the key manager. Subsequent requests for the group key cannot be serviced; hence group participation can be constrained. For example, elements 21, 22 show subscriber unsubscribing and the broker deleting the subscriber from the publisher publish audience. Elements 23, 24 address the request to delete the group key from the key manager.

A TEE within each participant device may be used to enforce the pub-sub roles that are assigned using mini-tickets. The TEE ensures the device facility for processing sub role is operational when the pub-sub request is serviced.

Note that embodiments are not limited to the specific flow described in FIGS. 3-1 and 3-2. A variety of alternative flows may also be used. Furthermore, a variety of IoT device roles may be enforced by IoT devices using mini-tickets. For example an IoT device acting as an intermediary may receive a mini-ticket allowing proxying of a message that further is inspected for security screening, anti-malware discovery, reputation building and forensics logging.

Embodiments thus provide a method in which asymmetric pair-wise and/or group keys are obtained using a key manager service in anticipation of topic-based, content-based publish-subscribe interaction patterns, or a hybrid of these. Using an embodiment, key management messages may be exchanged over an existing IoT messaging framework without relying on a separate dedicated or out-of-band messaging framework. Pub-sub context may be associated with a key management service, and further associating a key lifecycle with a pub-sub lifecycle. Embodiments may further associate a set of pub-sub privileges to a device credential, and assign a pub-sub role to a mini-ticket. Using a mini-ticket, dynamic role switching can be realized in a distributed system.

Figure 4:
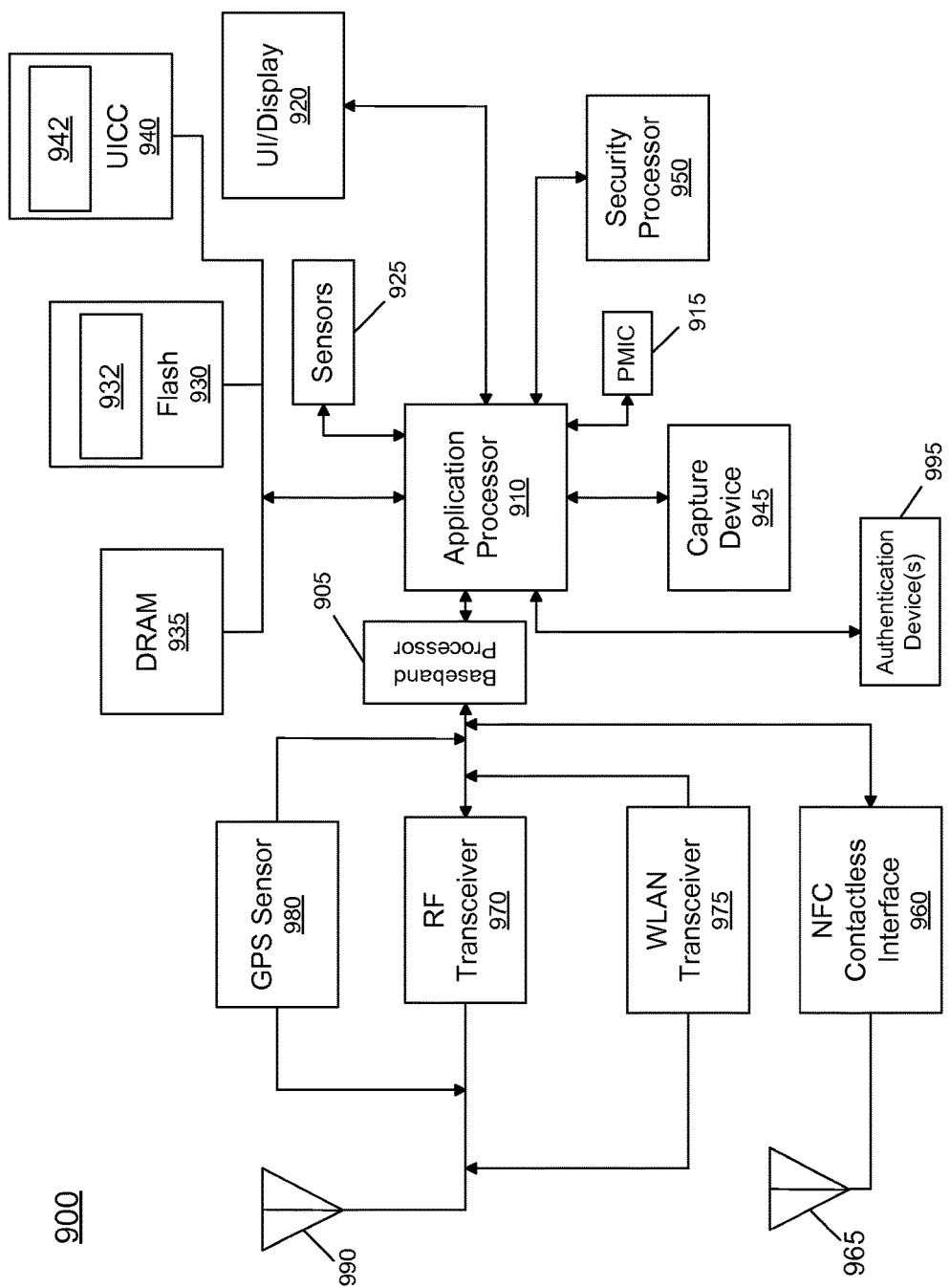
FIG. 4 is a block diagram of an example system with which embodiments can be used.

Referring now to FIG. 4, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media, mobile and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
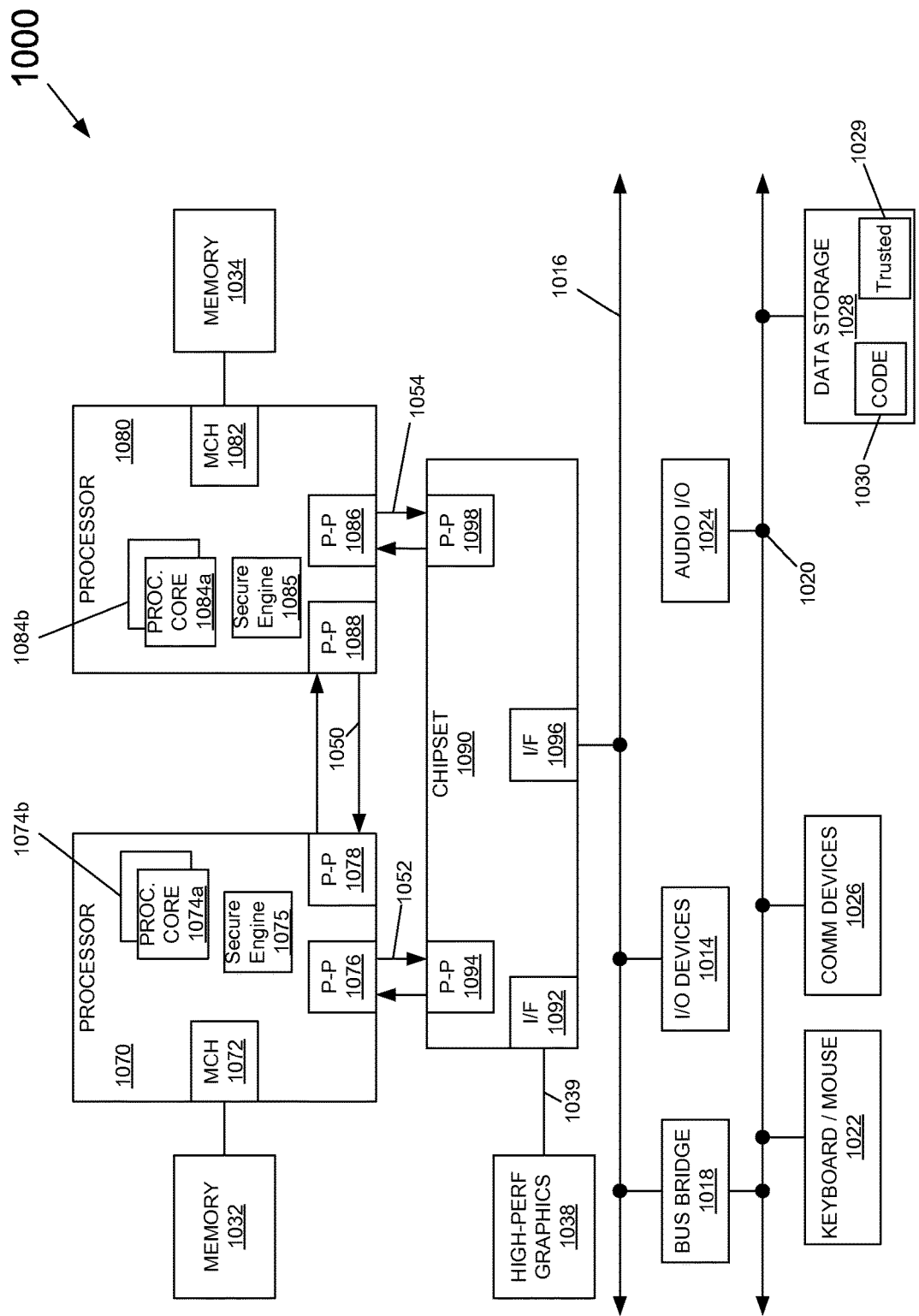
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

An example includes at least one computer readable storage medium comprising instructions that when executed enable a device to: request enrollment of the device with an identity provider, the enrollment including at least one role for the device for a publish-subscribe protocol of a distributed network; receive a device identity credential from the identity provider and store the device identity credential in the device; receive a ticket credential for a first topic associated with a first publisher, the ticket credential including the at least one role for the device; receive a group key from a key manager for a group associated with the publish-subscribe protocol; and receive content for the first topic in the device, the content protected by the group key.

Example 1 includes at least one computer readable storage medium comprising instructions that when executed enable a system to: receive a first request, for a first security ticket, from a first device, wherein the first request includes: (a)(i) a first device identity credential corresponding to a role for the first device with a publish-subscribe protocol of a distributed network, and (a)(ii) a first filter element associated with the a publish-subscribe protocol; send the first security ticket, which is restricted to the first filter element and includes a first key, to the first device; receive a second request, for a second security ticket, from a second device that is a publisher for the first filter element, wherein the second request includes the first filter element; and send the second security ticket to the second device, the second security ticket being restricted to the first filter element and including a second key that is a symmetric group key.

The "system" in the above example may be a server, such as key manager, with a function of delivering and managing keys. The system may use an environment such as that of FIG. 5 where requests may be stored in memory such as memory 1032, and keys may be generated in elements such as secure engine 1075. The "first device" may be mobile computing node using the environment of FIG. 4, where tickets are communicated via antennae 965, 990 and processed with processor 950 and stored in memory 932.

As used herein, to "receive" and the like includes either a push or a pull action. For example, a key manager may have a request pushed to it from a device or the key manager may pull the request from a device. The same is true with "provide", "send" and the like. Providing a key may include pushing the key to a device or having a device pull the key from the key manager or even directing the device to some storage location where the device may get the key.

Please note devices, such as devices 111, 112, 113, 114, 115 as well as server 216 may utilize platforms having one or more secure environments such as the capability for a TEE, in which transactions may be processed as described herein. In an example embodiment, the TEE may be implemented using Intel® SGX technology, Intel® TXT technology, or an ARM TrustZone, among others. To this end, processors and/or other hardware within such platforms may provide trusted hardware to perform trust assertions, random number generation and other security measures appropriate for given transactions.

Further, requests as used herein may include a variety of contents not explicitly addressed herein. For example, a request message may also include an authenticator section that may be used to authenticate the sender. The request body may also be protected with the same key as the authenticator and may include a cryptographic hash of the body that is encrypted with the encrypted part. In another embodiment, the authenticator may be digitally signed with an asymmetric key. Other values within a message (request or reply) may ensure the key is protected from replay (e.g., message may include a nonce) and other integrity attacks.

IoT devices 111, 112, 113, 114, 115 may be "constrained." As used herein "constrained" refers to an execution environment that is absent one or more critical resources typical of computation (e.g., memory, storage, computing, networking capacity). The constraint may be threshold based where some level of operation existing resources is depleted, but meaningful function/behavior is achieved. Survivability science is the science of meaningful computation subsequent to loss of computational resources. Some devices may be manufactured to be operating in "survival" mode by default. They can perform some duties but not all that may otherwise be expected of a device. For example, a constrained device may be constrained because it may lack credentials due to credential caching and replacement policy that deletes a less used credential in order to find resources for a more immediately used credential. The constraint of the storage for credentials requires the device to more frequently consult a key management service to re-obtain the deleted credential. As a result, the constrained device has a loss of autonomy or possibly loss of security and privacy due to its need to more frequently access credential servers that exist outside of a local realm that includes the device.

While in example 1 the second key is a symmetric group key, other embodiments may include pair-wise keys, asymmetric keys, and the like. The first and/or second keys may be temporal keys in some embodiment but not in others.

In example 2 the subject matter of the Example 1 can optionally include the at least one computer readable storage medium further comprising instructions that when executed enable the system to: receive a third request, for a third security ticket, from a third device, wherein the third request includes: (b)(i) a third device identity credential corresponding to a role for the third device with the publish-subscribe protocol, and (b)(ii) the first filter element; and send the third security ticket, which is restricted to the first filter element and includes a third key, to the third device.

In example 3 the subject matter of the Examples 1-2 can optionally include the at least one computer readable storage medium wherein the first device is one of a subscriber and a broker for the first filter element and the third device is another of a subscriber and a broker for the first filter element.

Thus, the first and third devices may each be brokers, may each be subscribers, and one may be broker while the other is a subscriber.

In example 4 the subject matter of the Examples 1-3 can optionally include the at least one computer readable storage medium wherein the role for the first device corresponds to a first set of publish-subscribe protocol privileges and the role for the third device corresponds to another set of publish-subscribe protocol privileges unequal to the first set of publish-subscribe protocol privileges.

Thus, the first device may be limited to publishing in regards to topic1 and the third device may be limited to consuming in regards to topic1. The privileges may be enforced via TEEs in the devices and/or the devices that communicate with the first and third devices.

In example 5 the subject matter of the Examples 1-4 can optionally include the at least one computer readable storage medium wherein the first security ticket includes the first device identity credential, which corresponds to a first set of publish-subscribe protocol privileges.

Thus, the first device may be limited to publishing in regards to topic1.

In example 6 the subject matter of the Examples 1-5 can optionally include the at least one computer readable storage medium of claim 1, further comprising instructions that when executed enable the system to: receive an additional first request, for an additional first security ticket, from the first device, wherein the additional first request includes an additional first device identity credential corresponding to an additional first role for the first device with the publish-subscribe protocol; and send the additional first security ticket, which includes an additional first key, to the first device; wherein the role is unequal to the additional role.

Thus, example 6 provides for dynamic shifting of roles. For example, a device may switch from a publisher regarding topic1 to a consumer regarding topic1. And as used herein, an identity credential can be a hybrid and may include two or more roles (i.e., both a consumer and a publisher) regarding a topic. This changing of privileges may relate to one topic or may include different topics where the device attains publisher privileges for topic1 but then attains consumer privileges for topicN.

Another version of example 6 includes the at least one computer readable storage medium of claim 1, further comprising instructions that when executed enable the system to: receive an additional first request, for an additional first security ticket, from the first device, wherein the additional first request includes an additional first device identity credential corresponding to an additional role for the first device with the publish-subscribe protocol; and send the additional first security ticket, which includes an additional first key and the additional first device identity credential, to the first device; wherein the role is unequal to the additional role.

In example 7 the subject matter of the Examples 1-6 can optionally include the at least one computer readable storage medium further comprising instructions that when executed enable the system to: receive an additional first request, for an additional first security ticket, from the first device, wherein the additional first request includes: (a)(i) an additional first device identity credential corresponding to an additional role for the first device with the publish-subscribe protocol, and (a)(ii) an additional first filter element associated with the publish-subscribe protocol; send the additional first security ticket, which is restricted to the additional first filter element and includes an additional first key, to the first device; wherein the role is unequal to the additional role and the first filter element is unequal to the additional first filter element.

In example 8 the subject matter of the Examples 1-7 can optionally include the at least one computer readable storage medium wherein the role is one of publisher and subscriber and the additional role is another of publisher and subscriber.

In example 9 the subject matter of the Examples 1-8 can optionally include the at least one computer readable storage medium wherein the first identity credential includes a certificate from a certificate authority that attests to the role for the first device.

In example 10 the subject matter of the Examples 1-9 can optionally include the at least one computer readable storage medium wherein the first filter element includes one of a topic for topic-based publish-subscribe protocol and a defined constraint for a content-based publish-subscribe protocol.

For instance, the "defined constraint" may be a keyword or metadata attribute that is searched in or corresponding to content that is to be published.

In example 11 the subject matter of the Examples 1-10 can optionally include the at least one computer readable storage medium further comprising instructions that when executed enable the system to: receive the first request from the first device via an unsecure public internet domain; send the first security ticket to the first device via the unsecure public internet domain; receive the second request from the second device via the unsecure public internet domain; and send the second security ticket to the second device via the unsecure public internet domain.

In example 12 the subject matter of the Examples 1-11 can optionally include the at least one computer readable storage medium further comprising instructions that when executed enable the system to: receive a third request to delete the symmetric group key from at least one of the first device, the second device, and a third device; and delete the symmetric group key.

In example 13 the subject matter of the Examples 1-12 can optionally include the at least one computer readable storage medium wherein the symmetric group key is a temporal session key.

Example 14 includes at least one computer readable storage medium comprising instructions that when executed enable a first device to: request enrollment of the first device with an identity provider, the enrollment including a role for the first device for a publish-subscribe protocol of a distributed network; receive a first device identity credential, from the identity provider and corresponding to the role, and store the first device identity credential in a memory of the first device; send a first request, for a first security ticket, to a key manager, wherein the first request includes: (a)(i) the first device identity credential, and (a)(ii) a first filter element associated with the a publish-subscribe protocol; and receive the first security ticket, which is restricted to the first filter element and includes a first key, from the key manager.

The "key manager" and/or "identity provider" in the above example may be a server, such as key manager, with a function of delivering and managing keys. The "key manager" and/or "identity provider" may use an environment such as that of FIG. 5 where requests may be stored in memory such as memory 1032, and keys may be generated in elements such as secure engine 1075. The "first device" may be a mobile computing node using the environment of FIG. 4, where tickets are communicated via antennae 965, 990 and processed with processor 950 and stored in memory 932. The identify provider may include a FIDO PKI Certificate Authority.

In example 15 the subject matter of the Example 14 can optionally include the at least one computer readable storage medium further comprising instructions that when executed enable the first device to: send a second request, for a second security ticket, to the key manager, wherein (b)(i) the first device is a publisher for the first filter element, and (b)(ii) the second request includes the first filter element; and receive the second security ticket from the key manager, the second security ticket being restricted to the first filter element and including a second key that is a symmetric group key.

Thus, the first device in this instance may be, for example, a publisher that may also have some other form of rights gained via the first key. Instead of being a publisher, the first device may be a broker that not only publishes but also consumes and requires a group key to do so. This is an alternative embodiment to that of FIGS. 3-1 and 3-2 whereby the broker does not include a group key.

In example 16 the subject matter of the Examples 14-15 can optionally include the at least one computer readable storage medium further comprising instructions that when executed enable the first device to: receive content, for the first filter element, which is encrypted by the second key; and decrypt the content with the second key.

In example 17 the subject matter of the Examples 14-16 can optionally include the at least one computer readable storage medium, wherein the first device is one of a subscriber and a broker for the first filter element.

In example 18 the subject matter of the Examples 14-17 can optionally include the at least one computer readable storage medium of claim 16, wherein the first security ticket includes the first device identity credential, which corresponds to a first set of publish-subscribe protocol privileges.

In example 19 the subject matter of the Examples 14-18 can optionally include the at least one computer readable storage medium further comprising instructions that when executed enable the first device to: request an additional enrollment of the first device with the identity provider, the additional enrollment including an additional role for the first device for the publish-subscribe protocol; receive an additional first device identity credential, from the identity provider and corresponding to the additional role, and store the additional first device identity credential in the memory of the first device; send an additional first request, for an additional first security ticket, to the key manager, wherein the additional first request includes the additional first device identity credential; and receive the additional first security ticket, which includes an additional first key, from the key manager; wherein the role is unequal to the additional role.

Thus, the first device may engage an identity provers like server 216 to dynamically alter its identity with regard to one or more filter elements.

In example 20 the subject matter of the Examples 14-19 can optionally include the at least one computer readable storage medium further comprising instructions that when executed enable the first device to: send an additional first request, for an additional first security ticket, to the key manager, wherein the additional first request includes: (a)(i) an additional first device identity credential corresponding to an additional role for the first device with the publish-subscribe protocol, and (a)(ii) an additional first filter element associated with the publish-subscribe protocol; receive the additional first security ticket, which is restricted to the additional first filter element and includes an additional first key, from the key manager; wherein the role is unequal to the additional role and the first filter element is unequal to the additional first filter element.

In example 21 the subject matter of the Examples 14-20 can optionally include the at least one computer readable storage medium wherein the first identity credential includes a certificate from a certificate authority that attests to the role for the first device.

In example 22 the subject matter of the Examples 14-21 can optionally include the at least one computer readable storage medium of claim 14, further comprising instructions that when executed enable the first device to send a third request to delete the symmetric group key to the key manager.

Example 23 includes an apparatus comprising: at least one memory; and at least one processor, coupled to the memory, to perform operations comprising: request enrollment with an identity provider, the enrollment including a role for the apparatus for a publish-subscribe protocol of a distributed network; receive a first identity credential, from the identity provider and corresponding to the role, and store the first device identity credential in the at least one memory; send a first request, for a first security ticket, to a key manager, wherein the first request includes: (a)(i) the first identity credential, and (a)(ii) a first filter element associated with the a publish-subscribe protocol; and receive the first security ticket, which is restricted to the first filter element and includes a first key, from the key manager.

The "key manager" and/or "identity provider" in the above example may be a server, such as key manager, with a function of delivering and managing keys. The "key manager" and/or "identity provider" may use an environment such as that of FIG. 5 where requests may be stored in memory such as memory 1032, and keys may be generated in elements such as secure engine 1075. The "apparatus" may be a mobile computing node using the environment of FIG. 4, where tickets are communicated via antennae 965, 990 and processed with processor 950 and stored in memory 932. The identify provider may include a FIDO PKI Certificate Authority.

Another version of example 23 includes an apparatus comprising: at least one memory; and at least one processor, coupled to the memory, to perform operations comprising: request at least one enrollment with at least on identity provider, the enrollment including at least one role for the apparatus for a publish-subscribe protocol of a distributed network; receive at least one first identity credential, from the at least one identity provider and corresponding to the at least on role, and store the at least one first device identity credential in the at least one memory; send at least one first request, for at least one first security ticket, to at least one key manager, wherein the at least one first request includes: (a)(i) the at least one first identity credential, and (a)(ii) at least one first filter element associated with the a publish-subscribe protocol; and receive the at least one first security ticket, restricted to the at least one first filter element and including at least one first key, from the at least one key manager.

Thus, contents of a request and/or reply may be distributed among several requests and/or replies and a combination of identifier certificates and keys and the like may be used in various embodiments.

In example 24 the subject matter of the Example 23 can optionally include wherein the operations comprise: send a second request, for a second security ticket, to the key manager, wherein (b)(i) the apparatus is a publisher for the first filter element, and (b)(ii) the second request includes the first filter element; and receive the second security ticket from the key manager, the second security ticket being restricted to the first filter element and including a second key receive content, for the first filter element, which is encrypted by the second key; and decrypt the content with the second key.

Another version of example 24 includes wherein the operations comprise: send at least one second request, for at least one second security ticket, to the at least one key manager, wherein (b)(i) the apparatus is a publisher for the at least one first filter element, and (b)(ii) the at least one second request includes the at least one first filter element; and receive the at least one second security ticket from the at least one key manager, the at least one second security ticket being restricted to the at least one first filter element and including at least one second key; receive content, for the at least one first filter element, which is encrypted by the at least one second key; and decrypt the content with the at least one second key.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
   receive a first request, for a first security ticket, from a first device, wherein the first request includes: (a)(i) a first device identity credential corresponding to a role for the first device with a publish-subscribe protocol of a distributed network, and (a)(ii) a first filter element associated with a publish-subscribe protocol;

send the first security ticket, which is restricted to the first filter element, to the first device;
receive a second request, for a second security ticket, from a second device that is a publisher for the first filter element, wherein the second request includes the first filter element; and
send the second security ticket to the second device, the second security ticket being restricted to the first filter element;
wherein (a) the first security ticket includes a first key, (b) the second security ticket includes a second key, (c) the second key is a symmetric group key, (d) receiving the first request includes receiving the first request into a memory, and (e) sending the first security ticket includes sending the first security ticket via a processor that is coupled to the memory.

2. The at least one non-transitory computer readable storage medium of claim 1, further comprising instructions that when executed enable the system to:
receive a third request, for a third security ticket, from a third device, wherein the third request includes: (b)(i) a third device identity credential corresponding to a role for the third device with the publish-subscribe protocol, and (b)(ii) the first filter element; and
send the third security ticket, which is restricted to the first filter element and includes a third key, to the third device.

3. The at least one non-transitory computer readable storage medium of claim 2, wherein the first device is one of a subscriber and a broker for the first filter element and the third device is another of a subscriber and a broker for the first filter element.

4. The at least one non-transitory computer readable storage medium of claim 2, wherein the role for the first device corresponds to a first set of publish-subscribe protocol privileges and the role for the third device corresponds to another set of publish-subscribe protocol privileges unequal to the first set of publish-subscribe protocol privileges.

5. The at least one non-transitory computer readable storage medium of claim 2, wherein the first security ticket includes the first device identity credential, which corresponds to a first set of publish-subscribe protocol privileges.

6. The at least one non-transitory computer readable storage medium of claim 1, further comprising instructions that when executed enable the system to:
receive an additional first request, for an additional first security ticket, from the first device, wherein the additional first request includes an additional first device identity credential corresponding to an additional role for the first device with the publish-subscribe protocol; and
send the additional first security ticket, which includes an additional first key, to the first device;
wherein the role is unequal to the additional role.

7. The at least one non-transitory computer readable storage medium of claim 1, further comprising instructions that when executed enable the system to:
receive an additional first request, for an additional first security ticket, from the first device, wherein the additional first request includes: (a)(i) an additional first device identity credential corresponding to an additional role for the first device with the publish-subscribe protocol, and (a)(ii) an additional first filter element associated with the publish-subscribe protocol;
send the additional first security ticket, which is restricted to the additional first filter element and includes an additional first key, to the first device;
wherein the role is unequal to the additional role and the first filter element is unequal to the additional first filter element.

8. The at least one non-transitory computer readable storage medium of claim 7, wherein the role is one of publisher and subscriber and the additional role is another of publisher and subscriber.

9. The at least one non-transitory computer readable storage medium of claim 1, wherein the first identity credential includes a certificate from a certificate authority that attests to the role for the first device.

10. The at least one non-transitory computer readable storage medium of claim 1, wherein the first filter element includes one of a topic for a topic-based publish-subscribe protocol and a defined constraint for a content-based publish-subscribe protocol.

11. The at least one non-transitory computer readable storage medium of claim 1, further comprising instructions that when executed enable the system to:
receive the first request from the first device via an unsecure public internet domain;
send the first security ticket to the first device via the unsecure public internet domain;
receive the second request from the second device via the unsecure public internet domain; and
send the second security ticket to the second device via the unsecure public internet domain.

12. The at least one non-transitory computer readable storage Medium of claim 1, further comprising instructions that when executed enable the system to:
receive a third request, to delete the symmetric group key, from at least one of the first device, the second device, and a third device; and
delete the symmetric group key.

13. The at least one non-transitory computer readable storage medium of claim 1, wherein the symmetric group key is a temporal session key.

14. At least one non-transitory computer readable storage medium comprising instructions that when executed enable a first device to:
request enrollment of the first device with an identity provider, the enrollment including a role for the first device for a publish-subscribe protocol of a distributed network;
receive a first device identity credential, from the identity provider and corresponding to the role, and store the first device identity credential in at least one memory of the first device;
send a first request, for a first security ticket, to a key manager, wherein the first request includes: (a)(i) the first device identity credential, and (a)(ii) a first filter element associated with the a publish-subscribe protocol; and
receive the first security ticket, which is restricted to the first filter element, from the key manager;
wherein (a) the first security ticket includes a first key, (b) receiving the first security ticket includes receiving the first security ticket into the at least one memory, and (c) sending the first request includes sending the first request via a processor that is coupled to the at least one memory.

15. The at least one non-transitory computer readable storage medium of claim 14, further comprising instructions that when executed enable the first device to:

send a second request, for a second security ticket, to the key manager, wherein (b)(i) the first device is a publisher for the first filter element, and (b)(ii) the second request includes the first filter element; and receive the second security ticket from the key manager, the second security ticket being restricted to the first filter element and including a second key that is a symmetric group key.

16. The at least one non-transitory computer readable storage medium of claim 15, further comprising instructions that when executed enable the first device to:

receive content, for the first filter element, which is encrypted by the second key; and decrypt the content with the second key.

17. The at least one non-transitory computer readable storage medium of claim 16, wherein the first device is one of a subscriber and a broker for the first filter element.

18. The at least one non-transitory computer readable storage medium of claim 16, wherein the first security ticket includes the first device identity credential, which corresponds to a first set of publish-subscribe protocol privileges.

19. The at least one non-transitory computer readable storage medium of claim 14, further comprising instructions that when executed enable the first device to:

request an additional enrollment of the first device with the identity provider, the additional enrollment including an additional role for the first device for the publish-subscribe protocol;

receive an additional first device identity credential, from the identity provider and corresponding to the additional role, and store the additional first device identity credential in the at least one memory of the first device;

send an additional first request, for an additional first security ticket, to the key manager, wherein the additional first request includes the additional first device identity credential; and receive the additional first security ticket, which includes an additional first key, from the key manager;

wherein the role is unequal to the additional role.

20. The at least one non-transitory computer readable storage medium of claim 14, further comprising instructions that when executed enable the first device to:

send an additional first request, for an additional first security ticket, to the key manager, wherein the additional first request includes: (a)(i) an additional first device identity credential corresponding to an additional role for the first device with the publish-subscribe protocol, and (a)(ii) an additional first filter element associated with the publish-subscribe protocol;

receive the additional first security ticket, which is restricted to the additional first filter element and includes an additional first key, from the key manager;

wherein the role is unequal to the additional role and the first filter element is unequal to the additional first filter element.

21. The at least one non-transitory computer readable storage medium of claim 14, wherein the first identity credential includes a certificate from a certificate authority that attests to the role for the first device.

22. The at least one non-transitory computer readable storage medium of claim 15, further comprising instructions that when executed enable the first device to send a third request to delete the symmetric group key to the key manager.

23. An apparatus comprising:

at least one memory; and at least one processor, coupled to the at least one memory, to perform operations comprising:

request at least one enrollment with at least one identity provider, the enrollment including at least one role for the apparatus for a publish-subscribe protocol of a distributed network;

receive at least one first identity credential, from the at least one identity provider and corresponding to the at least on role, and store the at least one first device identity credential in the at least one memory;

send at least one first request, for at least one first security ticket, to at least one key manager, wherein the at least one first request includes: (a)(i) the at least one first identity credential, and (a)(ii) at least one first filter element associated with the a publish-subscribe protocol; and receive the at least one first security ticket, which is restricted to the at least one first filter element, from the at least one key manager;

wherein (a) the at least one first security ticket includes at least one first key, (b) receiving the at least one first security ticket includes receiving the at least one first security ticket into the at least one memory, and (c) sending the at least one first request includes sending the at least one first request via the at least one processor.

24. The apparatus of claim 23, wherein the operations comprise:

send at least one second request, for at least one second security ticket, to the at least one key manager, wherein (b)(i) the apparatus is a publisher for the at least one first filter element, and (b)(ii) the at least one second request includes the at least one first filter element; and receive the at least one second security ticket from the at least one key manager, the at least one second security ticket being restricted to the at least one first filter element and including at least one second key;

receive content, for the at least one first filter element, which is encrypted by the at least one second key; and decrypt the content with the at least one second key.

* * * * *